US009686175B2

(12) United States Patent
Nistor et al.

(10) Patent No.: US 9,686,175 B2
(45) Date of Patent: Jun. 20, 2017

(54) METHODS, SYSTEMS, AND COMPUTER READABLE MEDIA FOR TESTING NETWORK DEVICES USING SIMULATED APPLICATION TRAFFIC

(71) Applicant: Ixia, Calabasas (CA)

(72) Inventors: Marius Pavel Nistor, Bucharest (RO); Florin-Fabian Dedu, Bucharest (RO)

(73) Assignee: Ixia, Calabasas, CA (US)

( * ) Notice: Subject to any disclaimer, the term of this patent is extended or adjusted under 35 U.S.C. 154(b) by 653 days.

(21) Appl. No.: 14/164,218

(22) Filed: Jan. 26, 2014

(65) Prior Publication Data

US 2015/0212914 A1 Jul. 30, 2015

(30) Foreign Application Priority Data

Jan. 24, 2014 (RO) .............................. a 2014 00070

(51) Int. Cl.
*H04L 12/26* (2006.01)
*H04L 12/24* (2006.01)

(52) U.S. Cl.
CPC ............ *H04L 43/50* (2013.01); *H04L 41/142* (2013.01)

(58) Field of Classification Search
CPC ...................................................... H04L 43/50
USPC ........................................................ 702/122
See application file for complete search history.

(56) References Cited

U.S. PATENT DOCUMENTS

| 7,006,963 | B1 | 2/2006 | Maurer |
|---|---|---|---|
| 7,313,635 | B1 | 12/2007 | Zavalkovsky |
| 2007/0121516 | A1 | 5/2007 | Hannel et al. |
| 2007/0260428 | A1* | 11/2007 | Anderson ............. G06F 11/263 702/186 |
| 2009/0106746 | A1 | 4/2009 | Chaudhuri et al. |

(Continued)

OTHER PUBLICATIONS

Notification of Transmittal of the International Search Report and the Written Opinion of the International Searching Authority, or the Declaration for International Application No. PCT/US2015/012781 (Apr. 27, 2015).

(Continued)

*Primary Examiner* — Bryan Bui
(74) *Attorney, Agent, or Firm* — Jenkins, Wilson, Taylor & Hunt, P.A.

(57) ABSTRACT

Methods, systems, and computer readable media for testing network devices using simulated application traffic are disclosed. One method includes steps implemented in a network equipment test device including at least one processor. The method includes emulating data transfer operations of a plurality of server applications. The method further includes receiving application traffic from a plurality of different client applications. The method further includes queuing incoming connections received from the client applications. The method further includes, for each of the connections, attempting to correlate application-level data with one of the emulated server applications. The method further includes, in response to successful correlation of the received application-level data with one of the emulated server applications, performing application-specific processing for the emulated server application. Performing application-specific processing includes sending data from an emulated server application to a client application through a device under test.

17 Claims, 7 Drawing Sheets

(56) References Cited

U.S. PATENT DOCUMENTS

2013/0305091 A1* 11/2013 Stan ................ G06F 11/263
　　　　　　　　　　　　　　　　　　　　　　714/35
2013/0343181 A1　12/2013 Stroud et al.

OTHER PUBLICATIONS

Communication of European publication number and information on the application of Article 67(3) EPC for European Application No. 15740633.1 (Nov. 3, 2016).

* cited by examiner

```
         E1                                E2
1. CONNECT CONNID =1 PORT = 80    ACCEPT CONNID=1 PORT =80
2. SEND 0xAB01211CD...       ->      RECEIVE 0xAB01211CD...
3. RECEIVE 0x04511CD...      <-      SEND    0x04511CD...
4. SEND 0x012AB11CD...       ->      RECEIVE 0x012AB11CD...
5. RECEIVE 0x0CD4511...      <-      SEND    0x0CD4511...
6. SEND 0xAB01211CD...       ->      RECEIVE 0xAB01211CD...
7. RECEIVE 0x04511CD...      <-      SEND    0x04511CD...
8. DISCONNECT CONNID = 1             DISCONNECT CONNID = 1
```

1. CONNECT CONNID =1 PORT = 80    ACCEPT CONNID=1 PORT =80
2. SEND 0xAB01211CD...       ->      RECEIVE 0xAB01211CD...
3. RECEIVE 0x04511CD...      <-      SEND 0x04511CD...
4. SEND 0x012AB11CD...       ->      RECEIVE 0x012AB11CD... CORRELATOR = 1

5. RECEIVE 0x0CD4511...      <-      SEND 0x0CD4511...
6. SEND 0xAB01211CD...       ->      RECEIVE 0xAB01211CD...
7. RECEIVE 0x04511CD...      <-      SEND 0x04511CD...
8. DISCONNECT CONNID = 1          DISCONNECT CONNID = 1
```

FIG. 6

METHODS, SYSTEMS, AND COMPUTER READABLE MEDIA FOR TESTING NETWORK DEVICES USING SIMULATED APPLICATION TRAFFIC

PRIORITY CLAIM

This application claims the benefit of Romanian Patent Application No. a 2014 00070, filed Jan. 24, 2014; the disclosure of which is incorporated herein by reference in its entirety.

TECHNICAL FIELD

The subject matter described herein relates to testing network devices. More particularly, the subject matter described herein relates to testing network devices using simulated application traffic.

BACKGROUND

In order to test network devices, it is desirable to send application traffic to the network devices. For example, it may be desirable to emulate both client side applications and server side applications to test devices in the network that forward the application traffic between clients and servers. Application traffic may include any OSI layer 4-7 traffic, such as web browsing traffic, email traffic, different types of social networking traffic (e.g., Facebook® traffic, Twitter® traffic, or YouTube® traffic), different types of search engine traffic (e.g., Google® traffic or Yahoo® traffic), etc. Such traffic may traverse switches, routers, network address translators (NATs), firewalls, content aware devices, etc., when traveling from a client to a server or vice versa. In live networks, each server or bank of servers typically implements a single application. In such a case, it is not necessary for the server to parse the payload of the application traffic to identify whether the traffic is directed to its associated application. However, in a network test environment, a single network equipment test device may implement servers for plural different applications. As a result, in order to properly respond to communications from client applications, it is necessary for the network equipment test device to identify each application that is sending traffic to the network equipment test device so that the network equipment test device can respond appropriately to the applications.

One possible method of identifying the application at a network equipment test device where plural clients send a mix of application traffic to the device is to use the port on which the traffic is received to identify the application. For example, some applications, such as web servers, have a well-known transport layer port on which the servers listen for incoming connection requests. As a result, the destination port in a message from a client can be used to identify the application. However, many applications share the same transport layer port. For example, web browsing, search engines, and social networking traffic may all be addressed to the transport layer port designated for web traffic. Accordingly, the transport layer port cannot be used to properly identify the destination application when multiple applications listen on the same transport layer port.

Another possible solution to identifying application traffic at a network equipment test device is to use the source port and IP address to identify the application. However, if a network address translator is interposed between the client and the network equipment test device the network address translator may change the source port and IP address. Accordingly, the source port and IP address cannot be used to reliably identify the application in networks where network address translators are used.

Yet another possible solution to identifying the application at a network equipment test device is to insert application identifying information in the payload of the packet on the client side. However, inserting application identification information in the payload may not work when a content aware device is present in the network, because such non-standard information inserted in the packet payload may not be recognized by the content aware device and may prevent the packet from being forwarded to the network equipment test device. Accordingly, there exists a long felt need for testing network devices using simulated traffic that avoids at least some of these difficulties.

SUMMARY

Methods, systems, and computer readable media for testing network devices using simulated application traffic are disclosed. One method includes steps implemented in a network equipment test device including at least one processor. The method includes emulating data transfer operations of a plurality of server applications. The method further includes receiving application traffic from a plurality of different client applications. The method further includes queuing incoming connections received from the client applications. The method further includes, for each of the connections, attempting to correlate application-level data with one of the emulated server applications. The method further includes, in response to successful correlation of the received application-level data with one of the emulated server applications, performing application-specific processing for the emulated server application. Performing application-specific processing includes sending data from an emulated server application to a client application through a device under test.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
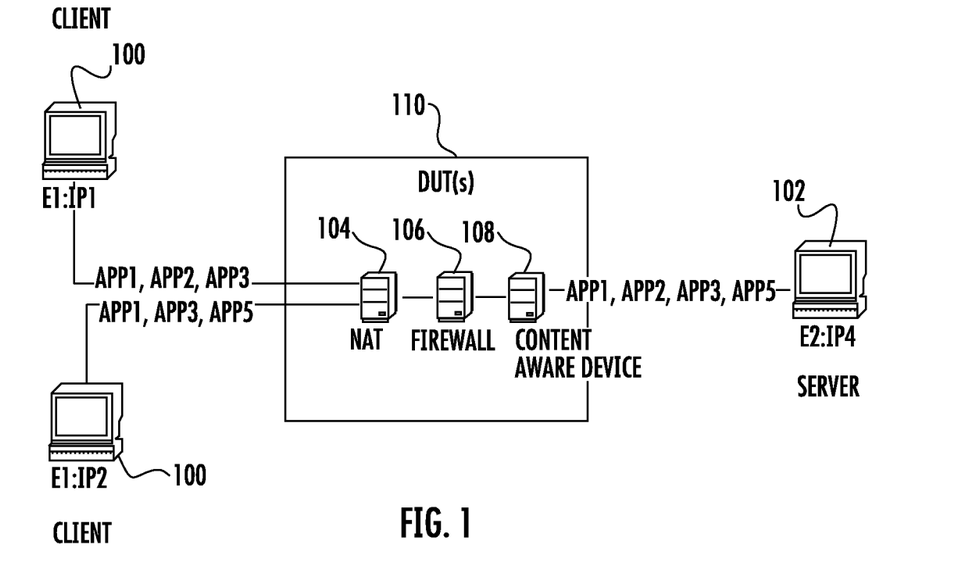
FIG. 1 is a block diagram illustrating an exemplary network environment in which a network equipment test device according to an embodiment of the subject matter described herein may operate.

The subject matter described herein includes methods, systems, and computer readable media for testing network devices using simulated application traffic. FIG. 1 is a block diagram illustrating an exemplary network environment in which a network equipment test device according to an embodiment of the subject matter described herein may operate. Referring to FIG. 1, in a real network, clients 100 may send application traffic for a plurality of different applications to a network equipment test device 102. Thus, if network equipment test device 102 is to properly respond to the traffic, network equipment test device 102 must emulate servers for each application and be capable of identifying the proper server code to execute for a given connection received from a client. This process is made more difficult when intermediate security devices, such as network address translator 104, firewall 106, and content aware device 108 process the traffic. Each of devices 104, 106, and 108 may generically be referred to as devices under test 110, since it may be desirable to see how the devices process the application traffic. For example, it may be desirable to identify traffic blocked or passed by a firewall 106. It may also be desirable to analyze how any of devices 104, 106, and 108 handle stress testing using traffic from different applications.

The subject matter described herein is not limited to testing firewalls, NATs, and content aware devices. Any network device which touches application level traffic can be tested using the subject matter described herein. Examples of other devices that can be tested include switches and routers.

As stated above, problems exist with network equipment test device 102 identifying the proper server application to execute using the destination port, source port and IP address or application identification information inserted in the payload. For example, the destination port cannot be used alone to identify the proper server to execute because applications may share the same destination port. The source port and IP address cannot be used because NAT 104 changes the source port and IP address before transmitting the packet to network equipment test device 102. Application specific information cannot be inserted in the payload because content aware device 108 may not forward such traffic.

In light of these difficulties, network equipment test device 102 may include a plurality of server emulators that each include a correlator portion and an application specific portion. The correlator portion of each server emulator may attempt to correlate incoming packets with its associated application based on application level information in the packet payload. As used herein, "application-level information" includes OSI layer 4-7 information that would normally be transmitted by a client according to the application being emulated. For example, application-level information for a Facebook® client may include data for a friend request. The application-specific portion may perform application-specific processing such as responding to messages from client applications according to the server application being emulated. Continuing with the Facebook® example, application-specific processing for a Facebook® server may include transmitting an acknowledgement to the client that the friend request has been communicated to the destination.

Figure 2A:
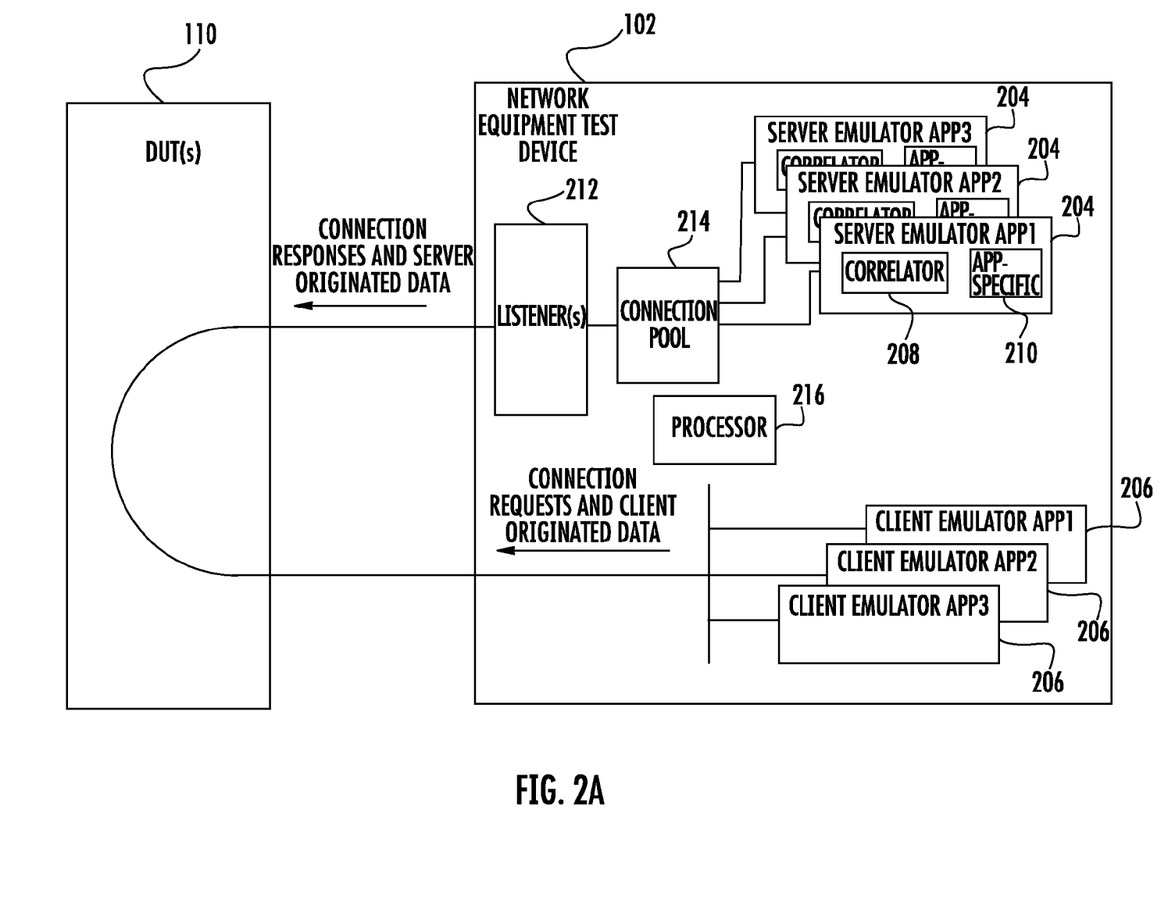
FIG. 2A is a block diagram illustrating an exemplary network equipment test device for emulating plural client and server applications according to an embodiment of the subject matter described herein.

FIG. 2A is a block diagram illustrating exemplary components of network equipment test device for testing devices under test 110. Referring to FIG. 2, network equipment test device 102 includes a plurality of server emulators 204 that emulate servers for different applications. For example, server emulators 204 may include social networking servers, such as Facebook® or Twitter® server emulators, web server emulators, search engine emulators, etc. Network equipment test device 102 may also include a plurality of client emulators 206 for emulating application clients. In an alternate implementation, a separate network equipment test device may emulate clients. In yet another alternate implementation, real clients may be used without emulating client specific traffic.

Figure 2B:
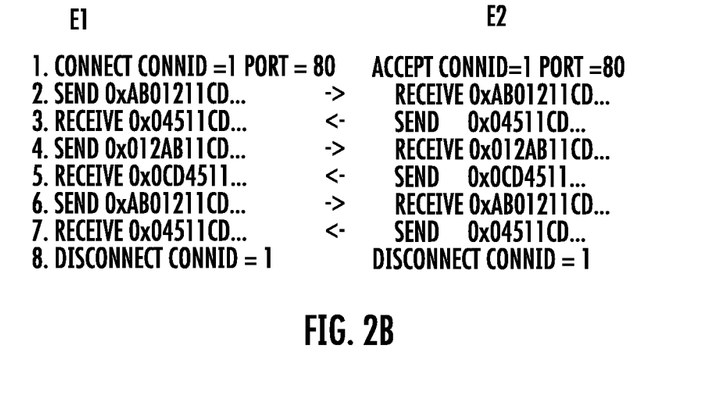
FIG. 2B is a flow diagram illustrating exemplary operations that may be performed by an emulated server and an emulated client according to one embodiment of the subject matter described herein.

In one embodiment, server emulators 204 and client emulators 206 may not fully implement their respective application protocols but may instead implement a series of data exchanges between a client and a server that is typically implemented by full versions of the client and server. For example, a network tap may be used to record an exchange between a web browser and a web server when the web browser requests data from the web server. The trace data may be used to generate a client side script and a server side script used to emulate the data exchange. FIG. 2B is a flow diagram illustrating exemplary operations performed by an emulated server and an emulated client using client and server side scripts according to an embodiment of the subject matter described herein. Referring to FIG. 2B, the left hand side of the diagram illustrates the script for emulated client E1, and the right hand side illustrates the script for emulated server E2. In line 1, emulated client E1 initiates a connection with emulated server E2. The connection is assigned connection ID 1 and the transport layer port is port 80. In line 2, emulated client at E1 then sends data to emulated server E2 over the connection. In this example, it is assumed that emulated server E2 identifies the connection from the received data as being associated with its respective server application that it emulates. Accordingly, in line 3, emulated server E2 sends data back to emulated client E1. In line 4, emulated client E1 sends data back to emulated server E2. In line 5, emulated server E2 sends responsive data back to emulated client E1. In line 6, emulated client E1 sends data to emulated server E2 and emulated server E2 receives the data. In line 7, emulated server E2 sends data to emulated client E1, which receives the data. In line 8, emulated client E1 disconnects from emulated server E2.

The subject matter described herein is not limited to the data exchange scenario illustrated in FIG. 2B. More complex data exchanges may be emulated without departing from the scope of the subject matter described herein. For example, an emulated client may initiate more than one connection with a server in a given data exchange. Such is the case when a web browser views multiple images or videos from a web server. Each image or video can be sent over a separate connection with the web server. Using client and server side scripts that emulate any typical data exchange between network clients and network servers is intended to be within the scope of the subject matter described herein.

Returning to FIG. 2A, network equipment test device 102 on the server side includes a plurality of listener components 212 that listen for incoming connections from clients. When an incoming connection is received, listener component 212 places the connection in a received connection pool 214 where the connection is processed by server emulators 204 to identify the appropriate server application and perform application-specific processing. Network equipment test device 102 may also include a processor 216, at least part of which is implemented in hardware, to execute the components of network equipment test device 102 illustrated in FIG. 2A.

Each client and server emulator illustrated in FIG. 2A may be implemented by a script that includes a series of send and receive operations that would be performed by a real client and server of a particular protocol. The execution of a script is done using an execution engine (not shown in FIG. 2A) which is fundamentally a script interpreter (similar to classical language interpreters like Tcl, Basic, etc.). Each thread has its own copy of the execution engine. The correlation process is part of this execution engine.

Figure 3:
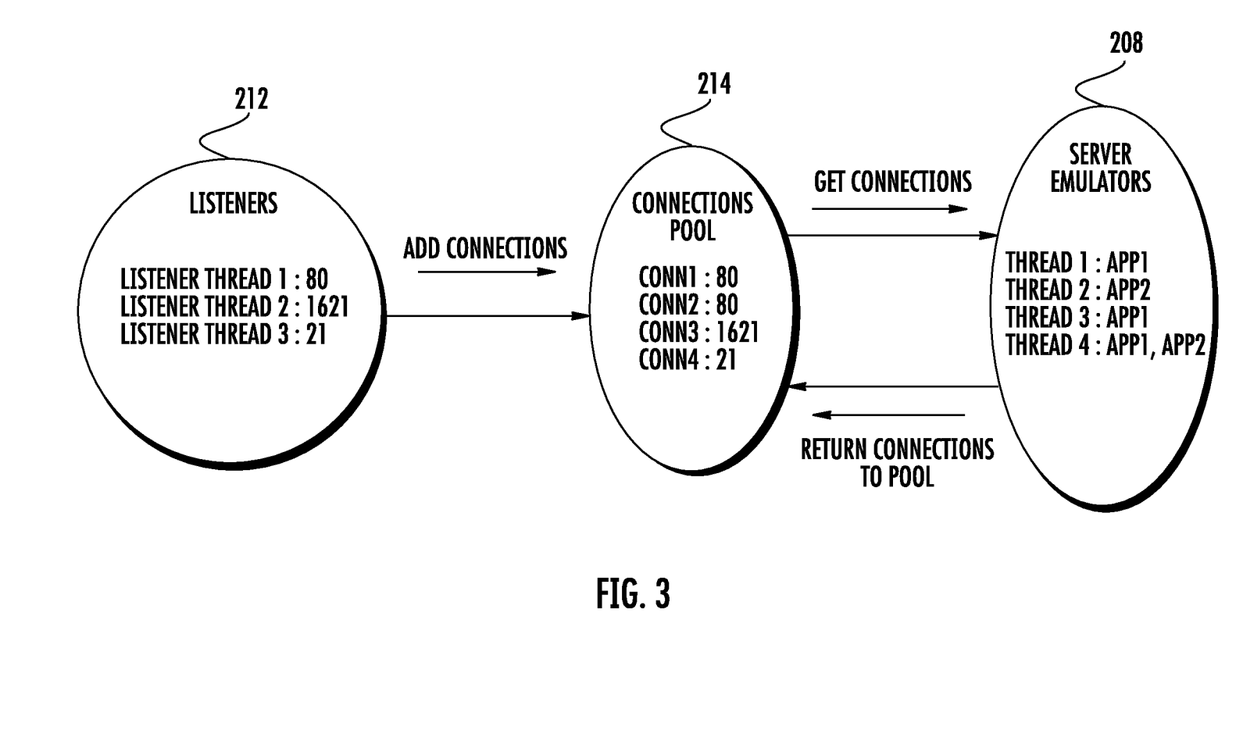
FIG. 3 is a block diagram illustrating exemplary components of a server emulator implemented by a network equipment test device according to an embodiment of the subject matter described herein.

FIG. 3 is a block diagram illustrating an exemplary relationship between listeners 212, connection pool 214, and correlators 208. In FIG. 3, listeners 212 listen on incoming ports and add received connections to connections pool 214. In the illustrated example, listeners 212 are implemented by threads of execution that listen on specific ports, which in the illustrated example are port 80, port 1621, and port 21. When an incoming connection is received, the associated listener 212 places the connection in connections pool 214. When a connection arrives in connections pool 214, a correlator 208 that listens on the corresponding port is notified. Each correlator 208 attempts to correlate data received over the connection with its associated application. For example, correlator 208 for application APP1 may attempt to correlate received application data with application APP1. If the correlation is successful, correlator 208 may invoke the application-specific component of the emulated server and process the connection by responding to data from the connection. If the correlation is not successful, the associated correlator places the connection back in connections pool 214, and the correlator for the next application listening on the same port attempts to correlate the data for the connection. The process continues until one of the applications properly correlates the data and processes the connection.

Figure 4:
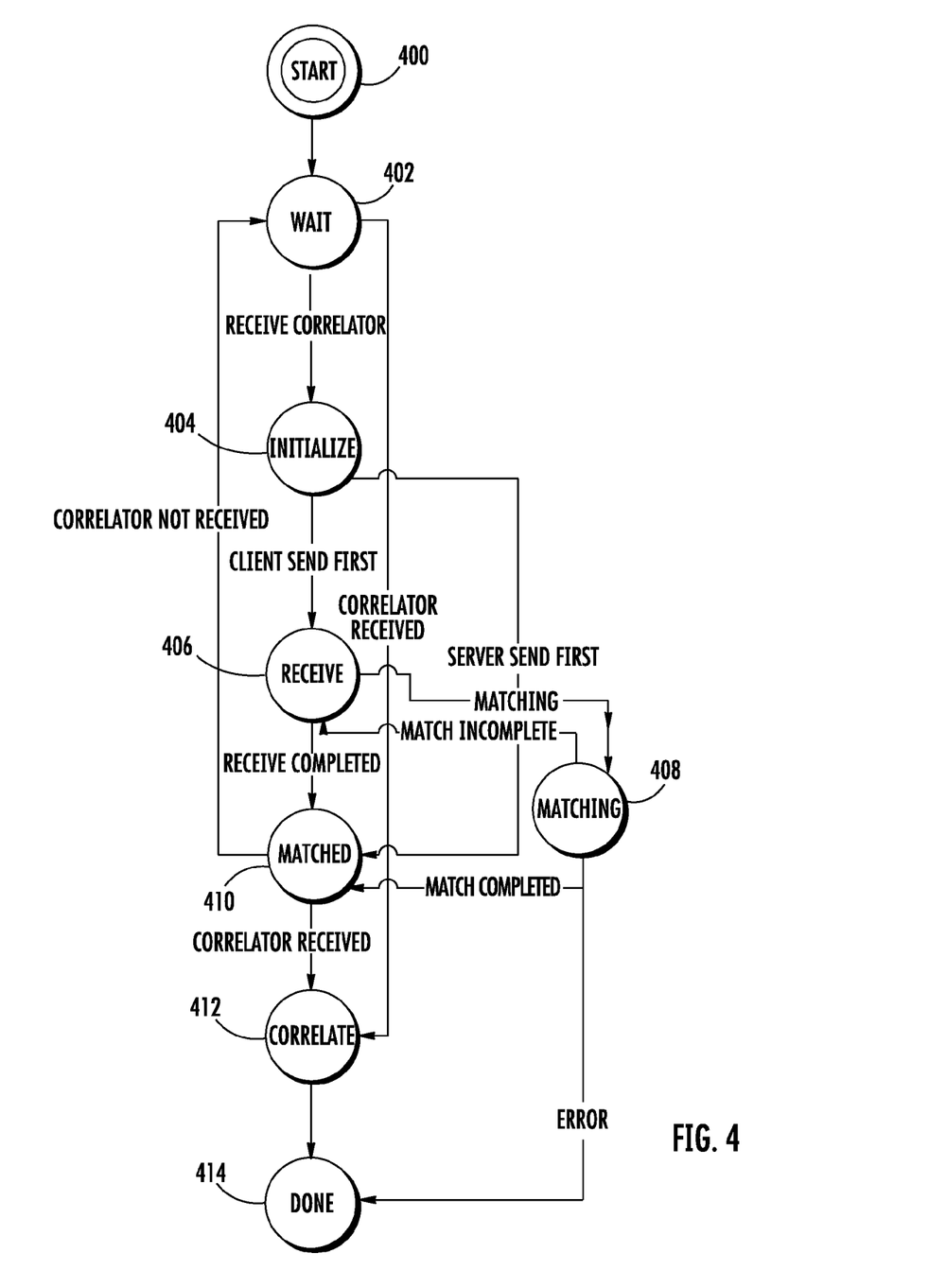
FIG. 4 is a state diagram illustrating a state machine implemented by the correlator portion of a server emulator according to an embodiment of the subject matter described herein.

FIG. 4 is a finite state machine illustrating exemplary states implemented by correlators 208. Referring to FIG. 4, in the Start state 400, a correlator 208 begins execution. From Start state 400, correlator 208 moves to Wait state 402, where correlator 208 waits for a connection on the port specified by the correlator's application. When a connection is received, correlator 208 transitions from Wait state 402 to Initialize state 404, where correlator 208 determines the minimum size of data for all correlation packages for applications currently listening on a given port to calculate a minimum amount of data to receive. As used herein, the term "correlation package" refers to data usable to correlate a connection with one of the applications. The reason for correlation is that the thread which executes the application script (including correlator 208) doesn't know from start that the connection it grabbed from the queue is for its application or not. That's why it has to do this correlation process. The thread simply grabbed a connection which may or not may be the right one needed by its application script. The thread executing the application script does all the correlation process to determine if this connection is for its application or whether the connection is for another thread's application. Thus, each thread executing the correlation routine needs to have information about all the other test applications' correlation packages so that it will be able to receive exactly how much is needed by receiving a minimum size out of all of the applications. The thread that currently has the connection then compares what was received against the correlation packages in the list of correlation packages for all of the application packages. If the thread that currently has the connection only tested received packets against correlation packages for its application, blocking could result. For example, suppose the first packet for a connection being tested has 200 bytes and according to its application script it expects 500 bytes. The thread will receive 200 bytes and then it will block forever because the client will not send to it the last 300 bytes because the connection is for another application owned by another thread that expects 300 bytes. So if each thread has access to the packages that should be received by all applications in test, each thread will do a memory compare (memcmp) of data received with the package for each application in list and then it will find that it received completely the package for another thread/application and it will return the connection to the queue along with information about the received data so that the other thread which will really need this connection will grab it and will simply go on "Correlation Received" path after getting from WAIT state and continue to execute the other operations in script.

Returning to the finite state machine diagram of FIG. 4, if the protocol being emulated by the server is one where the client sends first, correlator 208 transitions to Receive state 406 where correlator 208 begins receiving data from the connection. In Receive state 406, correlator 208 may initially receive the minimum amount of data for all of the server applications currently listening on a given port. Once that minimum amount of data is received, correlator 208 transitions to Matching state 408. In Matching state 408, correlator 208 attempts to correlate the received data against a list of correlation package candidates, also referred to herein as payload profiles. If the received data does not match completely any of the correlation packages in the list, but additional correlation packages with additional data bits are present in the list, control returns to Receive state 406 where additional bits are received. The finite state machine transitions between Receive state 406 and Matching state 408 until a single correlation package candidate remains. During each iteration of states 406 and 408, correlation packages that can be excluded from further consideration are excluded. Once a single correlator candidate remains, control proceeds to Matched state 410. In Matched state 410, it is determined whether the received packet is the correlation package that the correlator 208 expects to receive. If the packet is not the one that correlator 208 expects to receive, the finite state machine connection is returned to the pool and control returns to step 402. The next application associated with the port on which the packet was received attempts to correlate the connection.

In Matched state 410, if it is determined that the correlation package is the expected correlation package for the connection, correlator 208 transitions to Correlate state 412 where the connection is assigned to the application script and application-specific processing is performed according to the script. From Correlate state 412, control proceeds to state 414 where the correlation routine is exited.

The following example illustrates the operation of the correlation process when multiple applications listen on the same port. Consider that there are three applications on port 80. So the system will allocate three threads, which execute three different application scripts: Thread1—App1, Thread2—App2, and Thread3—App3. Also, remember that the applications are just a series of Send/Receive instructions. As stated above with respect to FIG. 2, the execution of a script is done using an execution engine which is fundamentally a script interpreter (similar to classical language interpreters like tool command language (Tcl), Basic, etc.). Each thread has its own copy of the execution engine. The correlation process is part of this execution engine. Now, let's consider the first package (correlation package) to be received on server by each application is like this: App1—400 bytes, App2—100 bytes, App3—50 bytes. Supposing Thread1 (which executes App1) grabs one connection from the connections pool. At this moment it doesn't know if this connection is for its script. Let's suppose that this connection is for App2 which is owned by Thread2. If Thread1 will receive 400 bytes as specified by App1, it will receive 100 bytes and then will hang forever because the client will send 100 bytes because it will try to communicate with an application server which expects 100 bytes. So, that's why Thread1 doesn't try to receive 400 bytes but it will simply get the minimum size from all the correlation packages of all the apps in which case this is 50. It will receive 50 bytes and then by comparing byte by byte what it received with the correlation packages in list, it will find that this data can be matched only by App2 and App1 so it will receive the minimum size from these two minus what was already receive which is 100−50=50 bytes more. It will receive 50 bytes more and it will finally match completely App2 after receiving 100 bytes in total.

Figure 5:
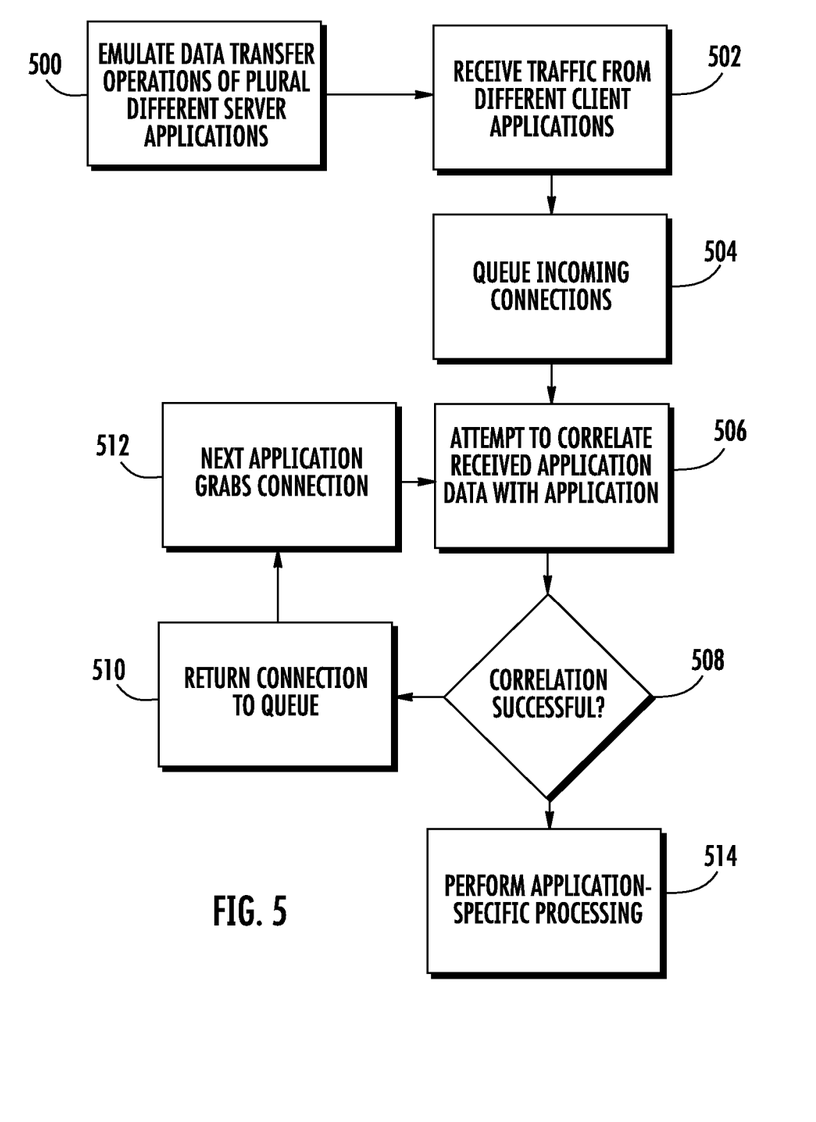
FIG. 5 is a flow chart illustrating an exemplary process for testing network devices using simulated application traffic according to an embodiment of the subject matter described herein.

FIG. 5 is a flow chart illustrating exemplary process for testing a network equipment test device using simulated application traffic according to an embodiment of the subject matter described herein. Referring to FIG. 5, in step 500, data transfer operations of a plurality of different server applications are emulated. As stated above, emulating the data transfer operations may include executing scripts that specify a series of SEND/RECEIVE operations for a particular application. The scripts may be written or generated automatically based on network trace data captured by a network probe or other data capture device. In step 502, application traffic is received for a plurality of clients. The application traffic may include typical exchanges implemented by network clients in requesting data from network servers. For example, typical social networking exchanges, web browsing exchanges, or video download exchanges may be implemented by client side scripts and server side scripts to test devices under test in the network through which the traffic passes. In step 504, incoming connections from the clients are queued. As stated above, listeners may place the connections in a connections pool until the correct server application can be emulated. In steps 506 and 508, an attempt is made to correlate the received data with one of the applications using received application-level data. If the correlation is not successful, control proceeds to step 510 where the connection is returned to the pool and the correlator for the next application grabs the connection in step 512. If the correlation is successful, control proceeds to step 514 where application specific processing is performed for the connection. Application-specific processing may include implementing the server side of the data exchange for a given application. For example, an emulated web server may send data requested by a web client during a browsing session.

According to another aspect of the subject matter described herein, correlators 208 handle applications which have multiple connections as a single flow of execution in the same script by interleaving the connection operations. The benefit of using the same script is reducing the number of threads needed to simulate complex applications which can spawn many connections. In this situation, the correlation algorithm described above is applied for each connection that appears in the script until all connections in the script are uniquely identified.

Figure 6:
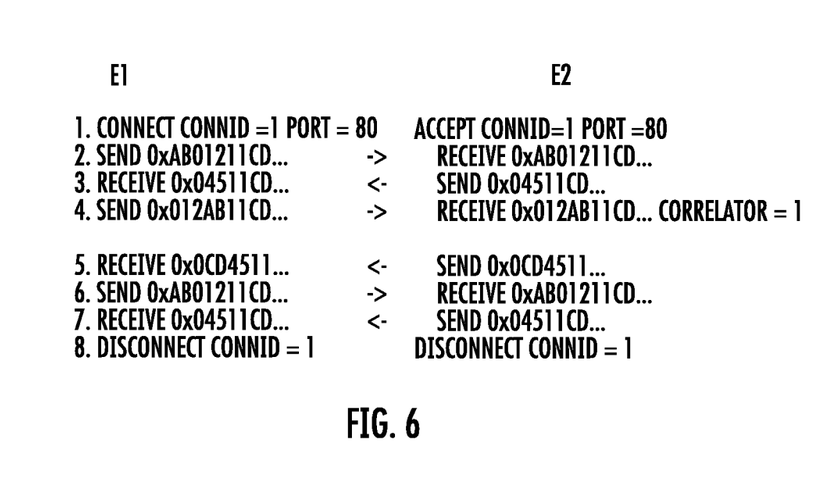
FIG. 6 is a flow diagram illustrating exemplary operations that may be performed by an emulated server and an emulated client in the case where received data may match multiple applications according to an embodiment of the subject matter described herein.

According to yet another aspect of the subject matter described herein, server emulators 204 and correlators 208 are capable of handling overlapping application scripts where data received in a given connection up to a point may be the same for more than one server application being emulated. In this case, the packet for which the application script is different will be marked as "correlating package" in the Receive instruction of this package (See FIG. 6). In FIG. 6, the instructions are the same as those illustrated in FIG. 2B, with the exception of the Receive instruction on the server side in line 4. The server side script is a series of SEND/RECEIVE instructions, each of which can have parameters. In FIG. 6, a new parameter (correlator=1) is added to the RECEIVE instruction in line 4 on the server side. The parameter correlator=1 will mean that when the script execution on server gets to this package on server, it will enter the correlation process. By default, the correlation process is done only for the first package in a connection and there is no need to add this parameter. The scripts are sent to the client and server at the setup phase so both client and server have their side of the script. Otherwise the "execution engine" wouldn't know what to run. The correlator=1 flag is not added to the packet payload, so the packets that traverse the network will be compliant with the application being emulated. We need to make a difference between "setup"— when the scripts are sent to both sides and "testing"—when the scripts are executed by both sides and result the data is sent over wire.

As stated above, at the setup phase, the scripts are sent to both client and server. On server side, in the setup phase, the scripts are parsed and the packages which are marked as "correlation package" will be added to the correlation packages list at the start of the test in addition to the first package in the connection which is always added in the list. At execution, the server thread executing the script will receive packets on the existing connection as specified in the script. When the server reaches the packet that is marked as a differentiator, the server enters the process of correlation described above and follows the steps until the correct connection is identified. The correlator routine described above can implement the case of overlapping applications scripts with one modification, the correlator thread will skip the Wait state and enter directly into the Initialized state since it already has a connection that is potentially the correct one.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for testing network devices using simulated application traffic, the method comprising:
in a network equipment test device including at least one processor:
emulating data transfer operations performed by a plurality of different server applications;
receiving application traffic from a plurality of different client applications;
queuing incoming connections received from the client applications;
for each of the connections, attempting to correlate application-level data with one of the emulated server applications, wherein attempting to correlate the received data with one of the server applications includes executing a correlator for each server application, wherein each correlator parses data for a connection to determine whether the data includes correlator data specific to its respective server application; and
in response to successful correlation of received application-level data with one of the emulated server applications, performing application-specific processing for the emulated server application, wherein performing application-specific processing includes sending data from the emulated server application to a client application through a device under test.

2. The method of claim 1 wherein receiving application traffic includes receiving application traffic destined for plural different server applications, at least some of the server applications sharing a transport layer port.

3. The method of claim 1 wherein receiving application traffic includes receiving application traffic destined for two different instances of the same server application sharing a transport layer port.

4. The method of claim 1 wherein each correlator is configured to return connections to a connections queue in response to failing to locate the correlator data for its respective application.

5. The method of claim 1 wherein each of the correlators attempts to identify the correlator data for its respective server application by comparing the received data to correlator packages in a list of correlator packages for all of the server applications monitoring data received over the same port in a given test.

6. The method of claim 1 wherein at least one of the correlators is configured to handle applications that have plural connections as a single flow of execution of the correlator.

7. The method of claim 1 wherein the emulated server applications are configured to identify packets marked as differentiators when client applications have overlapping scripts and to execute the correlators in response to detecting the differentiators.

8. The method of claim 1 wherein the device under test includes one of a network address translator (NAT), a firewall, a switch, a router, and a content aware device.

9. A system for testing a network device using simulated application traffic, the system comprising:

a network equipment test device including at least one processor;
a listener located on the network equipment test device for receiving incoming application traffic and for queuing incoming connections; and
a plurality of server emulators located on the network equipment test device, each server emulator including a correlator and an application-specific portion that emulates data transfer operations of a server application, the correlator attempting to correlate data received on one of the connections with an emulated server application using application-level data received over the connection, wherein each of the correlators is configured to parse data for a connection to determine whether the data includes correlator data specific to its respective server application, and, in response to successful correlation by the correlator, the application-specific portion performing application specific processing, wherein performing application-specific processing includes sending data from the emulated server application to a client application through a device under test.

10. The system of claim 9 wherein at least some of the server emulators share a transport layer port.

11. The system of claim 9 wherein the server emulators include different instances of the same application on the same transport layer port.

12. The system of claim 9 wherein each correlator is configured to return connections to a connections queue in response to failing to locate the correlator data for its respective server application.

13. The system of claim 9 wherein each of the correlators attempts to identify the correlator data for its respective server application by comparing the received data to correlator packages in a list of correlator packages for all of the server applications listening on a given port in a given test.

14. The system of claim 9 wherein at least one of correlators is configured to handle applications that have plural connections as a single flow of execution of the correlator.

15. The system of claim 9 wherein the server emulators are configured to identify packets marked as differentiators when applications have overlapping scripts and to execute the correlators in response to detecting the differentiators.

16. The system of claim 9 wherein the device under test comprises one of: a network address translator (NAT), a firewall, a switch, a router, and a content-aware device.

17. A non-transitory computer readable medium having stored thereon executable instructions that when executed by the processor of a computer control the computer to perform steps comprising:
in a network equipment test device including at least one processor:
emulating data transfer operations of a plurality of different server applications;
receiving application traffic from a plurality of different client applications;
queuing incoming connections received from the client applications;
for each of the connections, attempting to correlate application-level data with one of the emulated server applications, wherein attempting to correlate the received data with one of the server applications includes executing a correlator for each server application, wherein each correlator parses data for a connection to determine whether the data includes correlator data specific to its respective server application; and in response to successful correlation of received application-level data with one of the emulated server applications, performing application-specific processing for the emulated server application, wherein performing application-specific processing includes sending data from the emulated server application to a client application through a device under test.

* * * * *